(12) United States Patent
Abarra et al.

(10) Patent No.: US 6,613,460 B1
(45) Date of Patent: Sep. 2, 2003

(54) MAGNETIC RECORDING MEDIUM AND MAGNETIC STORAGE APPARATUS

(75) Inventors: E. Noel Abarra, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/584,603

(22) Filed: May 31, 2000

(30) Foreign Application Priority Data

Nov. 12, 1999 (JP) ............................................ 11-322961

(51) Int. Cl.⁷ .............................. G11B 5/66; G11B 5/70; H01L 1/00
(52) U.S. Cl. ................. 428/694 TS; 428/336; 428/900; 428/611; 428/651; 428/652
(58) Field of Search .................. 428/694 TS, 65.6, 428/336, 900, 611, 652, 651

(56) References Cited

U.S. PATENT DOCUMENTS 6,204,995 B1 * 3/2001 Hokkyo et al. .......... 360/97.01
6,248,416 B1 * 6/2001 Lambeth et al. ........... 428/65.3

FOREIGN PATENT DOCUMENTS

| JP | 03193851 A | * 8/1991 |
| JP | 4105213 | 4/1992 |
| JP | 4291017 | 10/1992 |
| WO | WO 9627187 | 9/1996 |

OTHER PUBLICATIONS

Schneibel et al., "Bend ductility, creep strength, and physical properties of extruded chromium–modified titanium aluminide (A13Ti)", Mater. Sci. Eng., A (1992), A152 (1–2), 126–31.*

* cited by examiner

Primary Examiner—Holly Rickman
(74) Attorney, Agent, or Firm—Greer, Burns & Crain Ltd.

(57) ABSTRACT

A magnetic recording medium is constructed to include a substrate, a magnetic layer made of a Co or Co-based alloy, and an underlayer disposed between the substrate and the magnetic layer. The underlayer is made of an ordered intermetallic material of FCC $L1_2$ or FCT $L1_0$ crystalline structure.

7 Claims, 9 Drawing Sheets

$L1_2, a \sim 4.1 \text{ Å}$

FIG.3

| $A_3B$ ALLOY | PARAMETER a (Å) | % MISMATCH FROM 4.1 Å |
|---|---|---|
| $Al_5CuHf_2$ | 4.013 | 2 % |
| $Al_5CuTi_2$ | 3.927 | 4 |
| $Al_5CuZr_2$ | 4.04 | 1.5 |
| $Al_{30}Dy_7Hf_3$ | 4.19 | 2 |
| $Al_{30}Dy_7Zr_3$ | 4.2 | 2 |
| $Al_3Er$ | 4.215 | 2.8 |
| $Al_{15}HfHo_4$ | 4.2 | 2 |
| $Al_{60}Hf_7Tb_{13}$ | 4.2 | 2 |
| $Al_5NiNb_2$ | 4.03 | 1.7 |
| $Al_5NiZr_2$ | 4.06 | 1 |

FIG.4

$L1_0, a \sim 4.1 \text{ Å}$

MAGNETIC RECORDING MEDIUM AND MAGNETIC STORAGE APPARATUS

BACKGROUND OF THE INVENTION

1. Field of the Invention

The present invention generally relates to magnetic recording media and magnetic storage apparatuses, and more particularly to a longitudinal magnetic recording medium and a magnetic storage apparatus which are suited for high-density longitudinal magnetic recording.

2. Description of the Related Art

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, a seed layer, an underlayer, a magnetic layer where information is written, a C or a Diamond-Like C (DLC) overlayer, and an organic lubricant layer which are successively stacked in this order. For example, the underlayer is made of Cr or a Cr-based alloy, and the magnetic layer is made of a CoCr-based alloy.

The medium noise is reduced by decreasing the exchange coupling between grains, by promoting more Cr segregation in the CoCr-based alloy which forms the magnetic layer. Lowering the medium noise also involves decreasing the grain size and grain size distribution of the magnetic layer, for example, by reducing the thickness of the underlayer. Underlayers which are made of materials such as CrMo, CrTiB, NiAl or the like are presently used in magnetic recording media.

The underlayer described above also promotes crystallographic axis (c-axis or magnetic anisotropy axis) orientation in a plane which increases remanence magnetization of and thermal stability of bits on the magnetic layer. Much success has been realized with an underlayer having a B2 crystal structure, such as NiAl and FeAl which have the (211) texture when deposited on a glass substrate.

However, the (211) texture is weak for the underlayer having the B2 crystal structure, including NiAl and FeAl. For this reason, it is necessary to increase the thickness of the underlayer in order to improve the (211) texture and to obtain a sufficiently high medium coercivity, as compared to a case where a Cr-based alloy is formed on a NiP layer. As a result, there are limitations in controlling the grain size and the grain size distribution of the magnetic layer by way of reducing the thickness of the underlayer, and that it is difficult to further improve the signal-to-noise ratio (SNR) of the magnetic recording medium.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium comprising a substrate, a magnetic layer made of a Co or Co-based alloy, and an underlayer disposed between the substrate and the magnetic layer, where the underlayer is made of an ordered intermetallic material of FCC $L1_2$ or FCT $L1_0$ crystalline structure. According to the magnetic recording medium of the present invention, the underlayer promotes the formation of small grain sizes and reduced grain size distribution of the magnetic layer.

Still another object of the present invention is to provide a magnetic recording medium comprising a substrate, a magnetic layer made of a CoCrPt-X alloy and having a thickness of 5 to 30 nm, where X=B, Mo, Ta, W and alloys thereof, and an underlayer disposed between the substrate and the magnetic layer, where the underlayer is made of an ordered intermetallic material of FCC $L1_2$ or FCT $L1_0$ crystalline structure and having a thickness of 3 to 100 nm. According to the magnetic recording medium of the present invention, the underlayer promotes the formation of small grain sizes and reduced grain size distribution of the magnetic layer.

In the magnetic recording medium, the underlayer having the FCC $L1_2$ crystalline structure may be selected from a group of $Al_5CuZr_2$, $Al_5CuHf_2$, $(AlCr)_3Ti$, $Al_{67}Cr_8Ti_{25}$, $Al_5NiZr_2$, $Al_5CuTi_2$, $Al_5NiNb_2$, $Al_{30}Dy_7Hf_3$, $Al_{30}Dy_7Zr_3$, $Al_3Er$, $Al_{15}HfHo_4$, and $Al_{60}Hf_7Tb_{13}$. Such materials used for the underlayer have the proper crystal structure and lattice parameter to promote epitaxy with the magnetic layer, since Co c-parameter is 0.406 nm.

In the magnetic recording medium, the underlayer having the FCT $L1_0$ crystalline structure may be γ-TiAl. This material γ-TiAl used for the underlayer has the proper crystal structure and lattice parameter to promote epitaxy with the magnetic layer. γ-TiAl is FCT, and develops a (001) texture when deposited at a low substrate temperature Ts or at Ts $\geq 200°$ C. This texture results in the c-axis of the magnetic layer being in-plane.

In the magnetic recording medium, the underlayer may be alloyed with at least one element selected from a group of B, Cu, Cr, Hf, Mo, Mn, Ta, Ti, V, Zr or alloys thereof. In this case, it becomes possible to promote smaller grain sizes and to reduce stress in the magnetic layer by the alloying of such elements.

In the magnetic recording medium, the underlayer may be made essentially of tetragonal $Al_3Ti$ which is alloyed with an element selected from a group of Ni, Cu, Cr, Mn, Zn, Fe, Co, Ag, Pd, Pt, Au and Rh which make the FCT $L1_0$ crystalline structure into FCC $L1_2$ crystalline structure. Alloying the $Al_3Ti$ with the above elements transforms the $L1_0$ crystalline structure, that is, the tetragonal structure, into the $L1_2$ crystalline structure, which makes the crystallographic planes such as (100), (010) and (001) have similar dimensions which provide a more uniform lattice for the magnetic layer to grow on.

In the magnetic recording medium, the underlayer may have a lattice parameter a which satisfies $3.9 \text{ Å} \leq a \leq 4.3 \text{ Å}$. By setting the lattice parameter a to this range, it provides a good lattice match to that of the magnetic layer, so as to better promote epitaxy.

In the magnetic recording medium, the underlayer may have a multi-layer structure, and each layer of the multi-layer structure may be made of an ordered intermetallic material of FCC $L1_2$ or FCT $L1_0$ crystalline structure. Some $L1_2$ or $L1_0$ crystalline structures are better suited for controlling grain sizes and texture, while others may show improvement with thickness but do not grow the proper crystallographic texture when directly grown on a particular surface material. Accordingly, the use of the underlayer having the multi-layer structure can improve the in-plane c-axis orientation even for reduced total underlayer thickness.

A further object of the present invention is to provide a magnetic storage apparatus comprising at least one magnetic recording medium which includes a substrate, a magnetic layer made of a Co or Co-based alloy, and an underlayer disposed between the substrate and the magnetic layer, where the underlayer is made of an ordered intermetallic material of FCC $L1_2$ or FCT $L1_0$ crystalline structure. According to the magnetic storage apparatus of the present invention, the underlayer promotes the formation of small grain sizes and reduced grain size distribution of the magnetic layer, thereby enabling improved SNR of the magnetic recording medium.

Another object of the present invention is to provide a magnetic storage apparatus comprising at least one magnetic recording medium which includes a substrate, a magnetic layer made of a CoCrPt-X alloy and having a thickness of 5 to 30 nm, where X=B, Cu, Mo, Ta, W and alloys thereof, and an underlayer disposed between the substrate and the magnetic layer, where the underlayer is made of an ordered intermetallic material of FCC $L1_2$ or FCT $L1_0$ crystalline structure and having a thickness of 3 to 100 nm. According to the magnetic storage apparatus of the present invention, the underlayer promotes the formation of small grain sizes and reduced grain size distribution of the magnetic layer, thereby enabling improved SNR of the magnetic recording medium.

Accordingly, the present invention can simultaneously improve the texture of the underlayer and control the grain size and the grain size distribution of the magnetic layer, to thereby enable further improvement of the SNR of the magnetic recording medium.

Other objects and further features of the present invention will be apparent from the following detailed description when read in conjunction with the accompanying drawings.

BRIEF DESCRIPTION OF THE INVENTION

DESCRIPTION OF THE PREFERRED EMBODIMENTS

Embodiments of a magnetic recording medium according to the present invention and a magnetic storage apparatus according to the present invention will now be described with reference to the accompanying drawings.

Figure 1:
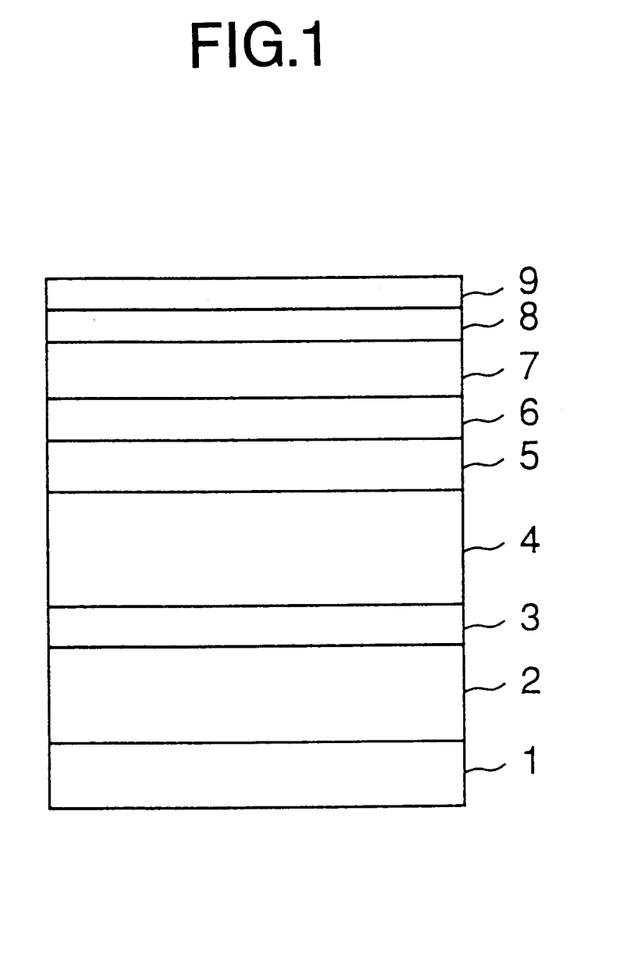
FIG. 1 is a cross sectional view showing an important part of a first embodiment of a magnetic recording medium according to the present invention.

FIG. 1 is a cross sectional view showing an important part of a first embodiment of a magnetic recording medium according to the present invention.

The magnetic recording medium shown in FIG. 1 includes a substrate 1 made of Al or glass ceramic, a NiP layer 2, a seed layer 3, an underlayer 4, an intermediate layer 5 made of a Cr-based alloy, a CoCr-based alloy layer 6, a magnetic layer 7 made of Co or a Co-based alloy such as a CoCr-based alloy, a C or DLC overlayer 8, and an organic lubricant layer 9 which are successively stacked in the order shown.

The NiP layer 2 is preferably oxidized and/or mechanically textured. When oxidized, NiP forms a good base for the growth of Cr (002) texture. NiP is hard and is essential for tribology purposes. The NiP can also be textured which improves the medium orientation ratio while reducing head slider stiction.

The seed layer 3 is provided to promote adhesion and/or crystallographic texture of the underlayer 4 formed thereon. The seed layer 3 is made of a Cr-based alloy including a material selected from a group of Mo, Ti, V and W. Cr-rich alloys with the BCC crystal structure tend to grow a (002) texture on oxidized NiP. Hence, the provision of the Cr-rich seed layer 3 promotes an in-plane orientation ($11\bar{2}0$) for the magnetic layer 7 which is made of the CoCr-based alloy, for example.

The underlayer 4 is comprised of an ordered intermetallic material of Face-Centered Cubic (FCC) $L1_2$ or Face-Centered-Tetragonal(FCT) $L_0$ crystalline structure, with a thickness of 3 to 100 nm, so as to promote formation of small grain sizes and reduced grain size distribution in the magnetic layer 7.

The underlayer 4 comprised of the $L1_2$ crystalline structure material may be $Al_5CuZr_2$, $Al_5CuHf_2$, $(AlCr)_3Ti$, $Al_{67}Cr_8Ti_{25}$, $Al_5NiZr_2$, $Al_5CuTi_2$, $Al_5NiNb_2$, $Al_{30}Dy_7Hf_3$, $Al_{30}Dy_7Zr_3$, $Al_3Er$, $Al_{15}HfHo_4$, and $Al_{60}Hf_7Tb_{13}$. Such materials used for the underlayer 4 have the proper crystal structure and lattice parameter to promote epitaxy with the magnetic layer 7, since Co c-parameter is 0.406 nm.

On the other hand, the underlayer 4 comprised of the $L1_0$ crystalline structure may be γ-TiAl. This material γ-TiAl used for the underlayer 4 has the proper crystal structure and lattice parameter to promote epitaxy with the magnetic layer 7. Because γ-TiAl is FCT, this material grows a (001) texture which enhances the c-axis of the magnetic layer 7 to be in-plane. In this case, the underlayer 4 may be made slightly Al-rich so that the Al content is 51 to 55 at.%. The presence of too much twinning may reduce the magnetic coercivity of the magnetic layer 7. However, this slightly Al-rich composition range of the underlayer 4 reduces twinning which is very common for FCC materials.

In either case where the underlayer 4 is comprised of the $L1_2$ or $L1_0$ crystalline structure, the underlayer 4 may be alloyed with at least one element selected from a group of B, Cr, Hf, Mo, Mn, Ta, Ti, V, Zr or alloys thereof. In this case, it becomes possible to promote smaller grain sizes and to reduce stress due to better lattice matching in the magnetic layer 7 by the alloying of such elements.

Furthermore, the underlayer 4 may be made essentially of tetragonal $Al_3Ti$ which is alloyed with an element selected from a group of Ni, Cu, Cr, Mn, Zn, Fe, Co, Ag, Pd, Pt, Au and Rh which make the $L1_0$ crystalline structure into the $L1_2$ crystalline structure. Alloying the tetragonal $Al_3Ti$ with the above elements transforms the $L1_0$ crystalline structure into the $L1_2$ crystalline structure, which makes the crystallographic planes such as (100), (010) and (001) have similar dimensions which provide a more uniform lattice for the magnetic layer 7 to grow on or for the intermediate layer 5 to grow on.

In this embodiment, the underlayer 4 has a lattice parameter a which satisfies 3.9 Å≦a≦4.3 Å. This range of the lattice parameter a matches that of the magnetic layer 7, to better promote epitaxy.

The intermediate layer 5 is made of a Cr-M alloy having a BCC crystal structure with a thickness of 1 to 30 nm, where M is an element selected from a group of B, Mn, Mo, Ti, V and W. Such materials used for the intermediate layer 5 has the proper lattice parameter to promote epitaxy with the magnetic layer 7. In addition, Cr adheres very well to various kinds of materials such that the Cr-M alloy makes a good buffer layer between the underlayer 4 and the magnetic layer 7.

The CoCr-based alloy layer 6 has a HCP crystal structure with a thickness of 1 to 10 nm, and is used to promote epitaxy and to narrow the grain size distribution of the magnetic layer 7. When a CoCr-based alloy magnetic layer having the HCP crystal structure is grown directly on a Cr-based layer having the BCC crystal structure, a portion of the magnetic layer in contact with this Cr-based layer having the BCC crystal structure is adversely affected due to the lattice mismatch and/or Cr diffusion. In this case, the magnetic anisotropy as well as the total magnetization of the magnetic layer are reduced. On the other hand, the use of the non-magnetic CoCr-based alloy layer 6 having the HCP crystal structure prevents such undesirable effects on the magnetic layer 7. As a result, this embodiment can increase the magnetic anisotropy and the coercivity of the magnetic layer 7, and also improve the in-plane orientation. The full magnetization of the magnetic layer 7 is also obtainable and the so-called "dead layer" portion is minimized. Moreover, the formation of smaller grains at the interface portion of the magnetic layer 7 is reduced.

The magnetic layer 7 may be made of a CoCrPt-X alloy with a thickness of 5 to 30 nm, where X is an element selected from a group of B, Cu, Mo, Ta, W and alloys thereof.

The C or DLC overlayer 8 protects the magnetic recording medium when in contact with a head. This overlayer 8 also protects the magnetic layer 7 from corrosion.

Figure 2:
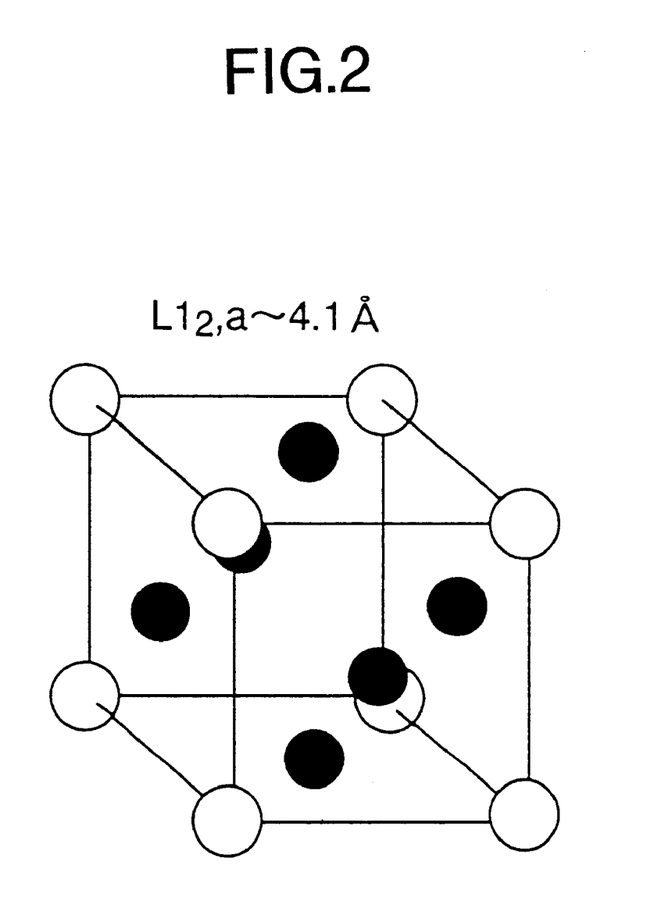
FIG. 2 is a diagram showing an ordered FCC $L1_2$ crystalline structure which may be used for the underlayer.

FIG. 2 shows an ordered FCC $L1_2$ crystalline structure which may be used for the underlayer 4. For example, the crystalline structure shown in FIG. 2 belongs to $Cu_3Au$ as well as many other alloys. However, in order for the lattice parameter of the underlayer 4 to substantially match that of a Cr or Cr-based magnetic layer having the HCP crystal structure, the lattice parameter of the underlayer 4 has to be approximately 4.1 Å.

Figure 3:
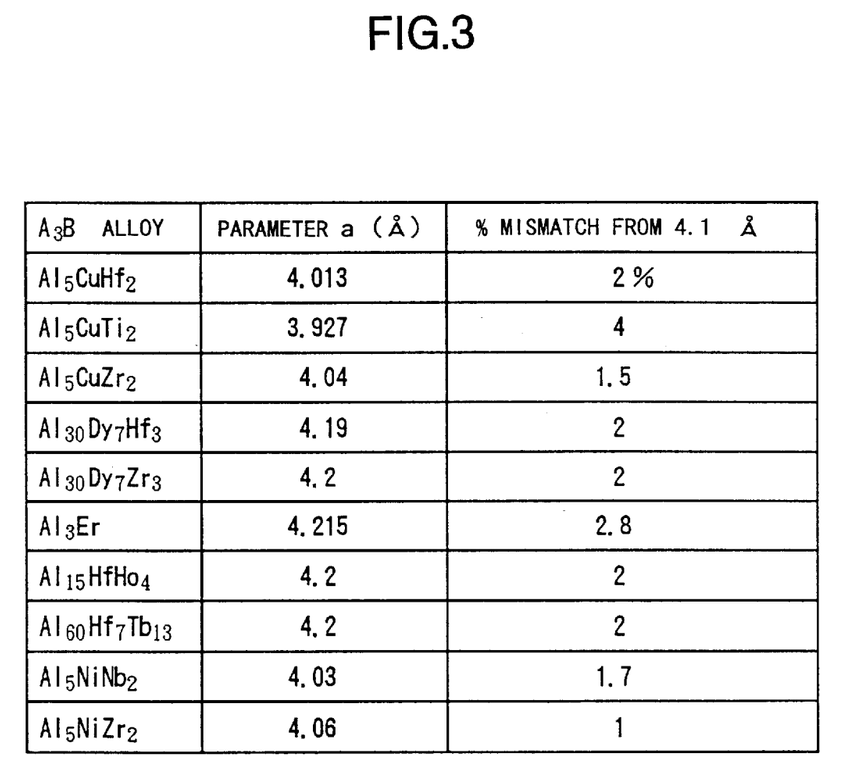
FIG. 3 is a diagram showing the lattice parameters a and the % mismatch from 4.1 Å, for various Al-based alloys having the $L1_2$ crystalline structure.

Most materials having the $L1_2$ crystalline structure with the proper lattice parameter that will substantially match that of the Cr or Cr-based magnetic layer having the HCP crystal structure are Al-based alloys, as shown in FIG. 3. FIG. 3 shows the lattice parameters a and the % mismatch from 4.1 Å, for various Al-based alloys having the $L1_2$ crystalline structure.

Figure 4:
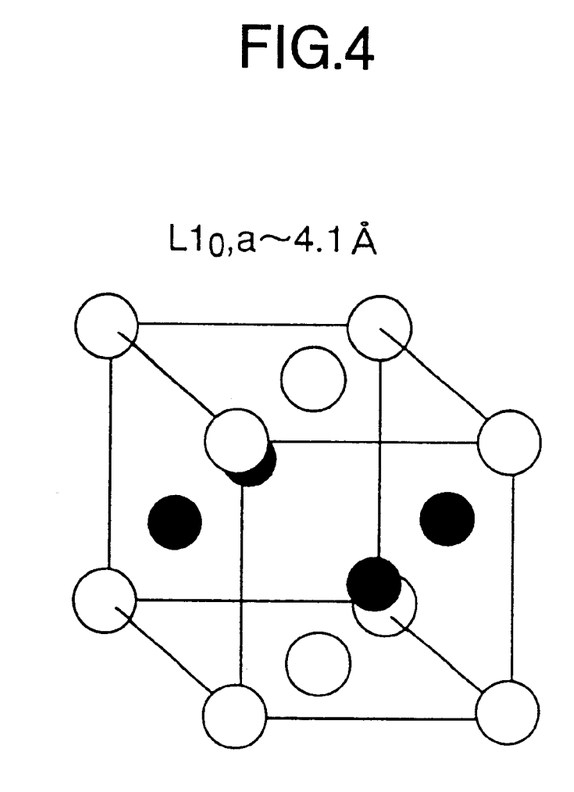
FIG. 4 is a diagram showing an ordered FCT $L1_0$ crystalline structure which may be used for the underlayer.

On the other hand, FIG. 4 shows an ordered FCT $L1_0$ crystalline structure which may be used for the underlayer 4. For example, the crystalline structure shown in FIG. 4 belongs to γ-TiAl. Although γ-TiAl is tetragonal, the lattice parameters a and c are a=0.4005 nm and c=0.407 nm which are not very different from those of the magnetic layer 7, and a ratio a/c is close to 1. Hence, it may be seen that γ-TiAl is suited for use as the underlayer 4. Doping γ-TiAl with other elements affects the electronic structure which reduces tegragonality.

Figure 5:
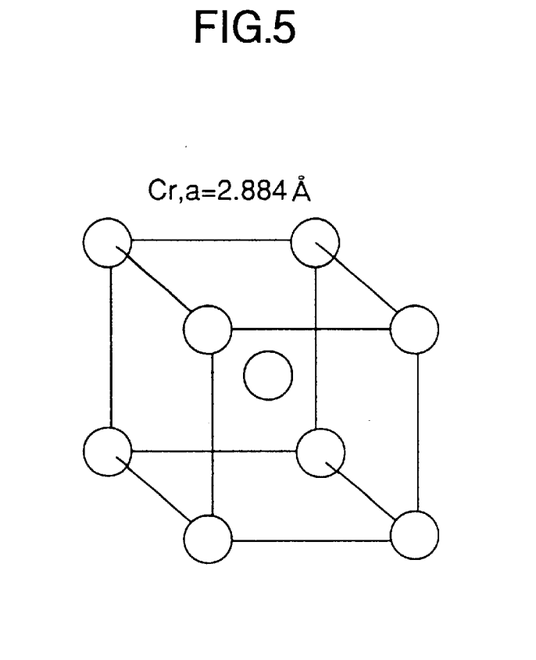
FIG. 5 is a diagram showing a BCC crystal structure of a Cr underlayer with the lattice parameter a of 2.884 Å.
Figure 6:
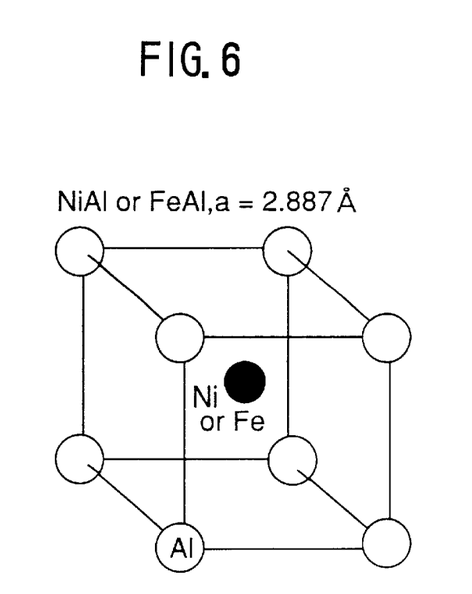
FIG. 6 is a diagram showing a B2 crystal structure of a NiAl or FeAl underlayer the lattice parameter a of 2.887 Å.

For comparison purposes, FIGS. 5 and 6 respectively show a BCC crystal structure of a Cr underlayer with the lattice parameter a of 2.884 Å, and a B2 crystal structure of a NiAl or FeAl underlayer the lattice parameter a of 2.887 Å.

With regard to FIG. 5, the Cr[110] lattice spacing of 4.08 Å matches Co-based magnetic layers such as CoCrPt-M alloys, where M is Ta, Ni, W or B (d(0002)~4.1 Å). Cr is usually alloyed with V, W or Mo to expand the lattice parameter to better match the increasing lattice parameters of Co-based alloys with higher Pt content, for example.

With regard to FIG. 6, NiAl has lattice parameter a which is very close to that of Cr and makes an appropriate underlayer for Co-based magnetic layers having the HCP crystal structure, such as a CoCr-based alloy. NiAl is an ordered intermetallic alloy and tends to form smaller grains when sputter deposited as compared to Cr-based alloys. As a result, NiAl promotes small grain sizes and good grain size distribution for magnetic layers deposited thereon. NiAl grows with a (211) and (110) textures which promote Co(10̄10) resulting in the c-axis of the magnetic layer becoming in-plane. However, the (211) texture is weak, and the presence of the (110) texture results in anisotropy orientations largely out of the plane as compared to Cr(002) which reveals excellent in-plane c-axis orientation. Moreover, NiAl need to be relatively thick in order to obtain a proper coercivity for the magnetic layer.

Therefore, it may be seen that using a Cr underlayer or a NiAl under layer cannot simultaneously achieve (i) excellent in-plane c-axis orientation and (ii) reduced grain size of the magnetic layer, unlike the first embodiment described above.

Figure 7:
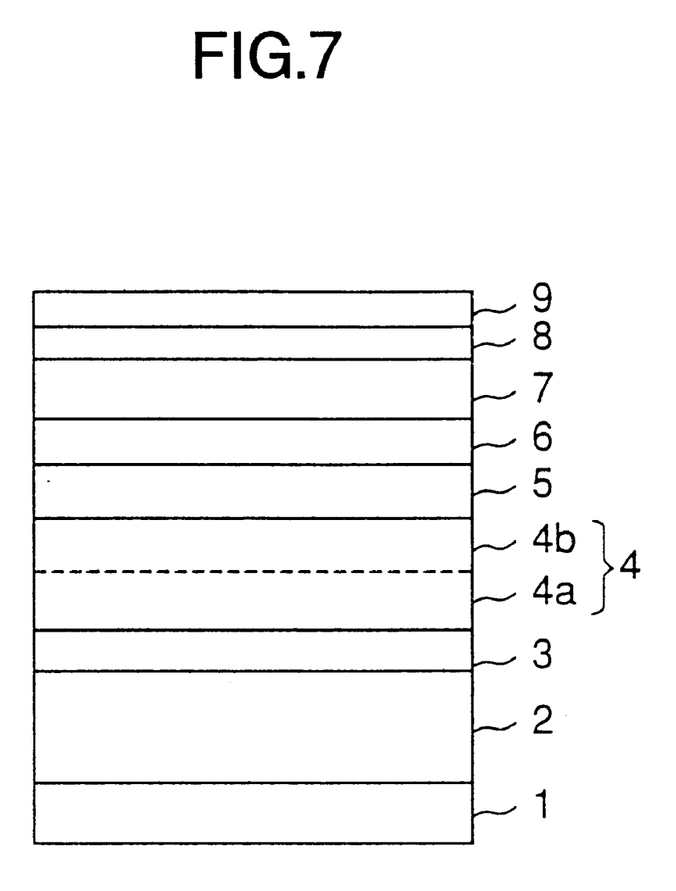
FIG. 7 is a cross sectional view showing an important part of a second embodiment of the magnetic recording medium according to the present invention.

Next, a description will be given of a second embodiment of the magnetic recording medium according to the present invention, by referring to FIG. 7. FIG. 7 is a cross sectional view showing an important part of the second embodiment of the magnetic recording medium. In FIG. 7, those parts which are the same as those corresponding parts in FIG. 1 are designated by the same reference numerals, and a description thereof will be omitted.

In FIG. 7, the underlayer 4 has a multi-layer structure. For the sake of convenience, FIG. 7 shows a case where the underlayer 4 has a bi-layer structure, including a first layer 4a and a second layer 4b. Each of the first and second layers 4a and 4b is comprised of an ordered intermetallic material of FCC $L1_2$ or FCT $L1_0$ crystalline structure, and the same materials used for the underlayer 4 in the first embodiment, including the materials shown in FIG. 3, may be used for each of the first and second layers 4a and 4b.

Some $L1_2$ or $L1_0$ crystalline structures are better suited for controlling grain sizes and texture, while others may show improvement with thickness but do not grow the proper crystallographic texture when directly grown on a particular surface material. Accordingly, the use of the underlayer 4 having the multi-layer structure can more positively and simultaneously achieve excellent in-plane c-axis orientation and reduced grain size of the magnetic layer 7.

Figure 8:
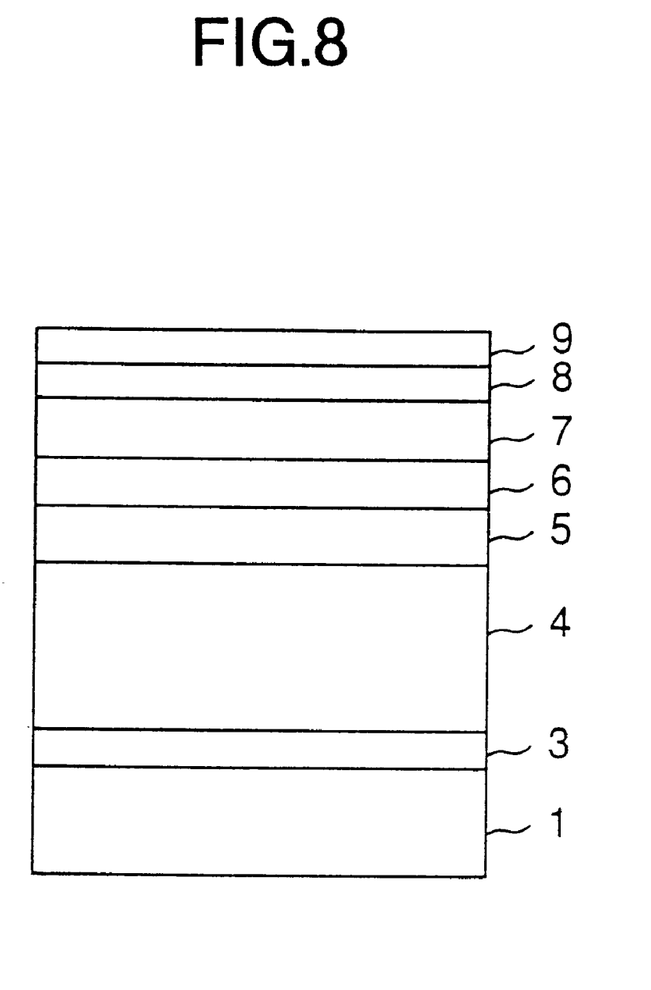
FIG. 8 is a cross sectional view showing an important part of a third embodiment of the magnetic recording medium according to the present invention.

Next, a description will be given of a third embodiment of the magnetic recording medium according to the present invention, by referring to FIG. 8. FIG. 8 is a cross sectional view showing an important part of the third embodiment of the magnetic recording medium. In FIG. 8, those parts which are the same as those corresponding parts in FIG. 1 are designated by the same reference numerals, and a description thereof will be omitted.

In this embodiment, the substrate 1 is made of glass, and a seed layer 3 is formed directly on the substrate 1. This seed layer 3 is made of NiAl or FeAl having a B2 crystal structure. NiAl and FeAl having the B2 crystal structure tend to grow a (211) texture on glass. Accordingly, this embodiment can promote the in-plane orientation (10$\bar{1}$0) for the CoCr-based magnetic layer 7 which has less stress than that with Cr-based underlayers due to lattice matching. Hence, this embodiment is suited for a case where a Co(10$\bar{1}$0) orientation is favoured on the glass substrate 1.

Figure 9:
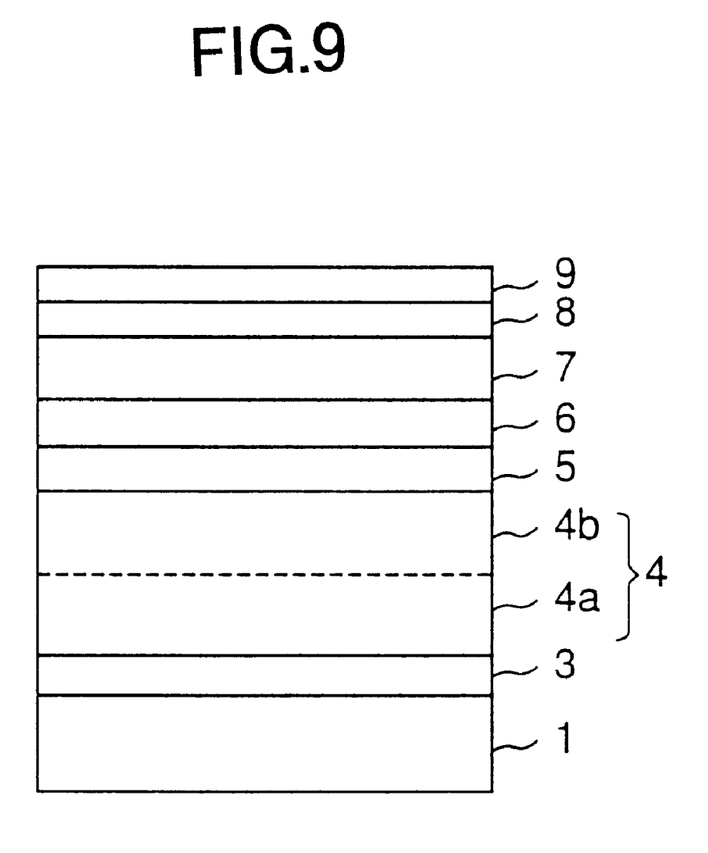
FIG. 9 is a cross sectional view showing an important part of a fourth embodiment of the magnetic recording medium according to the present invention.

Next, a description will be given of a fourth embodiment of the magnetic recording medium according to the present invention, by referring to FIG. 9. FIG. 9 is a cross sectional view showing an important part of the fourth embodiment of the magnetic recording medium. In FIG. 9, those parts which are the same as those corresponding parts in FIG. 7 are designated by the same reference numerals, and a description thereof will be omitted.

In this embodiment, the underlayer 4 of the third embodiment has the bi-layer structure of the second embodiment. In other words, the underlayer 4 is made up of the first and second layers 4a and 4b.

Next, a description will be given of a modification which is applicable to any of the first through fourth embodiments described above.

In this modification, the seed layer 3, which is disposed between the substrate 1 and the magnetic layer 7, is made of an ordered intermetallic material of FCC $L1_2$ or FCT $L1_0$ crystalline structure. In addition, the underlayer 4 is made of Cr-M, NiAl or FeAl, where M is an element selected from a group of B, Mn, Mo, Ti, V and W. Further, a ferromagnetic material selected from a group of CoCrTa, CoCrPt, CoCrPtB, CoCrPtTa, CoCrPtTaB, CoCrPtTaNb and CoCrPtWB and having a thickness of 5 to 30 nm may be used for the magnetic layer 7.

Figure 10:
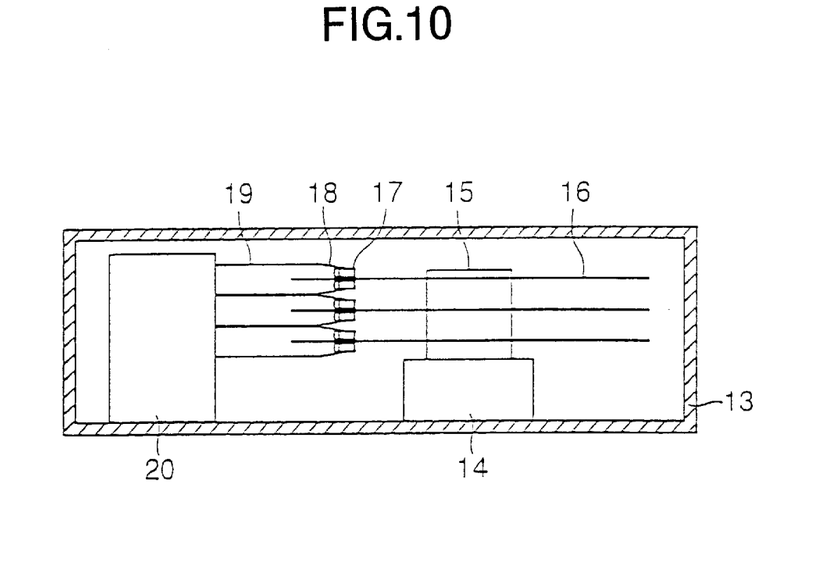
FIG. 10 is a cross sectional view showing an important part of an embodiment of a magnetic storage apparatus according to the present invention.

Next, a description will be given of an embodiment of a magnetic storage apparatus according to the present invention, by referring to FIGS. 10 and 11. FIG. 10 is a cross sectional view showing an important part of this embodiment of the magnetic storage apparatus, and FIG. 11 is a plan view showing the important part of this embodiment of the magnetic storage apparatus.

Figure 11:
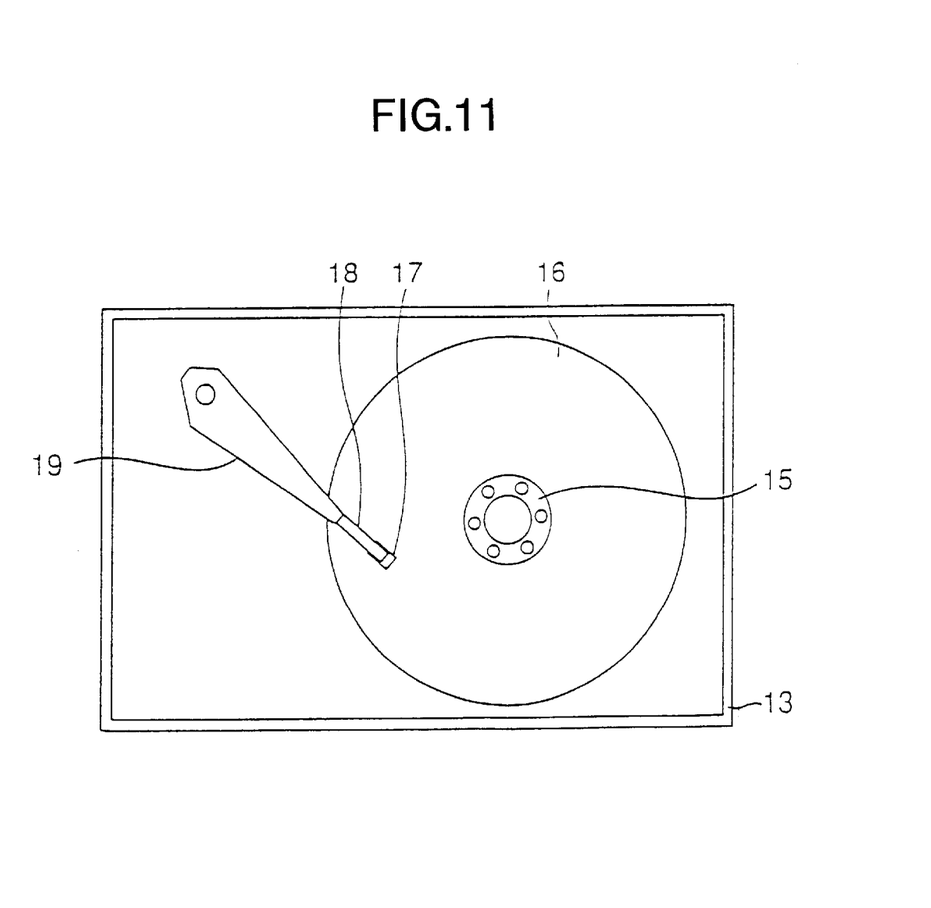
FIG. 11 is a plan view showing the important part of the embodiment of the magnetic storage apparatus.

As shown in FIGS. 10 and 11, the magnetic storage apparatus generally includes a housing 13. A motor 14, a hub 15, a plurality of magnetic recording media 16, a plurality of recording and reproducing (read and write) heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of any of the first through fourth embodiments of the magnetic recording medium described above in conjunction with FIGS. 1 through 9, or the modification thereof. Of course, the number of magnetic recording media 16 is not limited to three, and only one, two or four or more magnetic recording media 116 may be provided.

The basic construction of the magnetic storage apparatus is not limited to that shown in FIGS. 10 and 11. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
   a substrate;
   a magnetic layer made of Co or Co alloy; and
   an underlayer disposed between said substrate and said magnetic layer, said underlayer being made of an ordered intermetallic material of FCC $L1_2$ or FCT $L1_0$ crystalline structure and having a multi-layer structure, each layer of the multi-layer structure being made of an ordered intermetallic material of FCC $L1_2$ or FCT $L1_0$ crystalline structure.

2. The magnetic recording medium as claimed in claim 1, wherein said underlayer having the FCC $L1_2$ crystalline structure is selected from a group consisting of $Al_5CuZr_2$, $Al_5CuHf_2$, $(AlCr)_3Ti$, $Al_{67}Cr_8Ti_{25}$, $Al_5NiZr_2$, $Al_5CuTi_2$, $Al_5NiNb_2$, $Al_{30}Dy_7Hf_3$, $Al_{30}Dy_7Zr_3$, $Al_3Er$, $Al_{15}HfHo_4$, and $Al_{60}Hf_7Tb_{13}$.

3. The magnetic recording medium as claimed in claim 1, wherein said underlayer having the FCT $L1_0$ crystalline structure is $\gamma$-TiAl.

4. The magnetic recording medium as claimed in claim 1, wherein said underlayer is alloyed with at least one element selected from a group consisting of B, Cr, Hf, Mo, Mn, Ta, Ti, V, Zr or alloys thereof.

5. The magnetic recording medium as claimed in claim 1, wherein said underlayer is made of tetragonal $Al_3Ti$ which is alloyed with an element selected from a group consisting of Ni, Cu, Cr, Mn, Zn, Fe, Co, Ag, Pd, Pt, Au and Rh which make the FCT $L1_0$ crystalline structure into FCC $L1_2$ crystalline structure.

6. The magnetic recording medium as claimed in claim 1, wherein said underlayer has a lattice parameter a which satisfies 3.9 Å$\leq$a$\leq$4.3 Å.

7. A magnetic recording medium comprising:
   a substrate;
   a magnetic layer made of a CoCrPt-X alloy and having a thickness of 5 to 30 nm, where X=B, Cu, Mo, Ta, W and alloys thereof; and
   an underlayer disposed between said substrate and said magnetic layer,
   said underlayer being made of an ordered intermetallic material of FCC $L1_2$ or FCT $L1_0$ crystalline structure and having a thickness of 3 to 100 nm,
   said underlayer having a multi-layer structure, each layer of the multi-layer structure being made of an ordered intermetallic material of FCC $L1_2$ or FCT $L1_0$ crystalline structure.

* * * * *